(12) United States Patent
Matsuzaki et al.

(10) Patent No.: US 6,912,118 B2
(45) Date of Patent: Jun. 28, 2005

(54) SOLID ELECTROLYTIC CAPACITOR

(75) Inventors: Kenichiro Matsuzaki, Osaka (JP);
Yohei Kawata, Hirakata (JP); Seiji Omura, Daito (JP); Fumio Tatezono, Hirakata (JP); Yoshikazu Hirata, Daito (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 10/972,446

(22) Filed: Oct. 26, 2004

(65) Prior Publication Data

US 2005/0088804 A1 Apr. 28, 2005

(30) Foreign Application Priority Data

Oct. 28, 2003 (JP) ........................................ 2003-367621

(51) Int. Cl.[7] ................................................ H01G 9/02
(52) U.S. Cl. ........................................ 361/525; 252/62.2
(58) Field of Search ............................... 361/504, 523, 361/525, 526, 527, 528, 529; 252/62.2

(56) References Cited

U.S. PATENT DOCUMENTS 6,466,421 B1 * 10/2002 Monden et al. ................ 361/15
6,807,049 B2 * 10/2004 Konuma et al. ............ 361/524

FOREIGN PATENT DOCUMENTS

JP         60-37114      2/1985
JP         60-244017    12/1985

* cited by examiner

*Primary Examiner*—Eric W. Thomas
(74) *Attorney, Agent, or Firm*—Armstrong, Kratz, Quintos, Hanson & Brooks, LLP

(57) ABSTRACT

A solid electrolytic capacitor formed with a dielectric coating and a solid electrolyte layer successively formed on a surface of an anode body, wherein the solid electrolyte layer includes a conductive polymer containing at least a fluoroalkylnaphthalenesulfonate ion as a dopant. The conductive polymer can further contain a tetrahydronaphthalenesulfonate ion, a naphthalenesulfonate ion or a benzenesulfonate ion as the dopant. As a result, a solid electrolytic capacitor having a low ESR and a good heat resistance is provided.

12 Claims, 1 Drawing Sheet

SOLID ELECTROLYTIC CAPACITOR

BACKGROUND OF THE INVENTION

1. Field of the Invention

The present invention relates to a solid electrolytic capacitor using a conductive polymer as a solid electrolyte layer.

2. Description of the Background Art

In connection with size and weight reductions of electric equipment in recent years, a small capacitor of a large capacity for high frequencies, which has a low impedance in a high frequency region, has come to be required.

Though a mica capacitor, a film capacitor, a ceramic capacitor, and the like are used as capacitors for high frequencies, these capacitors are not suitable for large capacities.

On the other hand, an aluminum electrolytic capacitor, a tantalum solid electrolytic capacitor and the like are suitable for large capacities. Though a large capacity can be attained at low cost with the aluminum electrolytic capacitor, there are problems such as a change of electrolyte solution used over time because of evaporation and a high impedance at a high frequency.

Since the tantalum solid electrolytic capacitor uses solid manganese dioxide as an electrolyte, degradation in capacity of the capacitor is small. The solid electrolyte of the tantalum solid electrolytic capacitor, however, is formed by impregnation of sintered tantalum with aqueous solution of manganese nitrate followed by pyrolysis of manganese nitrate at about 350° C., which impregnation and pyrolysis steps usually have to be repeated for several to tens times. Therefore, considerable labor is required in a formation process of the solid electrolyte. In addition, since a coating of manganese dioxide is deficient in self-repairing, it has a drawback such as low durability.

In order to solve problems mentioned above, use of a conductive polymer, which has a good electrical conductivity and is easily formed to be a solid electrolyte, as a solid electrolyte layer has been proposed recently (see Japanese Patent Laying-Open No. 60-037114 and No. 60-244017). With this technique, a solid electrolytic capacitor can be obtained which, in comparison with the aforementioned aluminum electrolytic capacitor, tantalum solid electrolytic capacitor and the like, requires lower manufacturing cost, ensures a capacitance, has a dielectric coating that is not damaged, and has a small leaked current.

The conductive polymer is formed by electrolytic polymerization of heterocyclic monomers such as pyrrole, thiophene and furan with a supporting electrolyte to form a film of a polymer having a good conductivity on the dielectric coating using an anion of the supporting electrolyte as a dopant. As the dopant of the conductive polymer, a perchlorate ion, a boron tetrafluoride ion, a para-toluenesulfonate ion, a dodecylbenzenesulfonate ion, or the like is used.

A chemical oxidative polymerization method, an electrolytic oxidative polymerization method or the like is used as a method of forming the solid electrolyte layer including the conductive polymer containing the aforementioned dopant in the solid electrolytic capacitor as such. The chemical oxidative polymerization method is a method of performing oxidative polymerization of monomers using an oxidizing agent, and the electrolytic oxidative polymerization method is a method of performing oxidative polymerization of monomers on an anode utilizing an oxidation reaction occurring at the anode during electrolysis. Though the conductive polymer formed by the electrolytic oxidative polymerization generally has higher strength and conductivity than those of the conductive polymer formed by the chemical oxidative polymerization and forms a uniform good-quality solid electrolyte layer, it has a low heat resistance and when exposed to a high temperature, desorption of the dopant occurs and an ESR (Equivalent Series Resistance) increases.

SUMMARY OF THE INVENTION

An object of the present invention is to provide a solid electrolytic capacitor having a low ESR and a good heat resistance to solve the above-described problems.

To attain the object described above, a solid electrolytic capacitor according to one aspect of the present invention is a solid electrolytic capacitor formed with a dielectric coating and a solid electrolyte layer successively formed on a surface of an anode body, wherein the solid electrolyte layer includes a conductive polymer containing at least a fluoroalkylnaphthalenesulfonate ion as a dopant.

In the solid electrolytic capacitor according to the above-described aspect of the present invention, the solid electrolyte layer can include the conductive polymer further containing a tetrahydronaphthalenesulfonate ion as the dopant.

In addition, in the solid electrolytic capacitor according to the above-described aspect of the present invention, the solid electrolyte layer can include the conductive polymer further containing a naphthalenesulfonate ion as the dopant.

In addition, in the solid electrolytic capacitor according to the above-described aspect of the present invention, the solid electrolyte layer can include the conductive polymer further containing a benzenesulfonate ion as the dopant.

Furthermore, in the solid electrolytic capacitor according to the above-described aspect of the present invention, a ratio of the fluoroalkylnaphthalenesulfonate ion can be 20 mol % to 60 mol % of a total amount of the dopant, or the conductive polymer can be polypyrrole.

According to the present invention, a solid electrolytic capacitor having a low ESR and a good heat resistance can be provided by using at least the fluoroalkylnaphthalenesulfonate ion as the dopant.

The foregoing and other objects, features, aspects and advantages of the present invention will become more apparent from the following detailed description of the present invention when taken in conjunction with the accompanying drawing.

DESCRIPTION OF THE PREFERRED EMBODIMENTS

Figure 1:
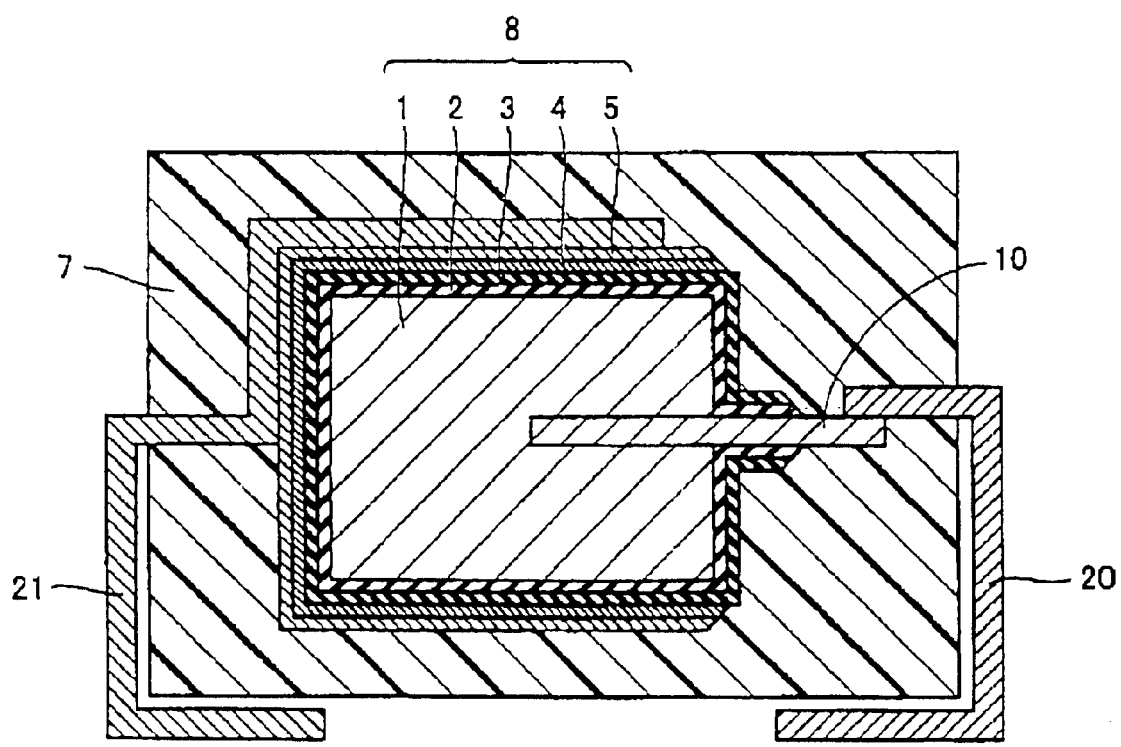
FIG. 1 is a schematic cross-sectional view of a solid electrolytic capacitor according to the present invention.

Referring to FIG. 1, a solid electrolytic capacitor according to the present invention is a solid electrolytic capacitor formed with a dielectric coating 2 and a solid electrolyte layer 3 successively formed on a surface of an anode body 1, wherein solid electrolyte layer 3 includes a conductive polymer containing at least a fluoroalkylnaphthalenesulfonate ion as a dopant. The fluoroalkylnaphthalene sulfonate ion used in the present invention is expressed as the following general formula (1).

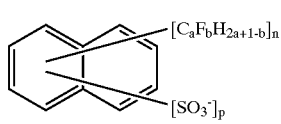

(1)

In general formula (1), n represents a number of a fluoroalkyl group ($[C_aF_bH_{2a+1-b}]$ group), which can be an arbitrary integer not less than 1 within an allowable range for substitution. A character a represents a carbon number of the fluoroalkyl group ($[C_aF_bH_{2a+1-b}]$ group), which can be an arbitrary integer from 1 to 20. A character b represents a fluorine number of the fluoroalkyl group ($[C_aF_bH_{2a+1-b}]$ group), which can be an arbitrary integer from 1 to 2a+1. A character p represents a number of a sulfonate ion group ($[SO_3^-]$ group), which can be an arbitrary integer not less than 1 within an allowable range for substitution. A heat resistance tends to decrease if the carbon number of the fluoroalkyl group ($[C_aF_bH_{2a+1-b}]$ group) is larger than 20. When two or more fluoroalkyl groups ($[C_aF_bH_{2a+1-b}]$ groups) are included, the carbon numbers and fluorine numbers of respective fluoroalkyl groups ($[C_aF_bH_{2a+1-b}]$ groups) may be different from each other, or may be the same. It is to be noted that, in general formula (1), the fluoroalkyl group ($[C_aF_bH_{2a+1-b}]$ group) and sulfonate ion group ($[SO_3^-]$ group) shown in positions penetrating both aromatic rings of a naphthalene ring mean that, the fluoroalkyl group ($[C_aF_bH_{2a+1-b}]$ group) and sulfonate ion group ($[SO_3^-]$ group) can locate in any positions in the naphthalene ring within an allowable range for substitution for hydrogen of the naphthalene ring, provided that a condition of orientation is satisfied.

Specific examples of the fluoroalkylnaphthalenesulfonate ion expressed as general formula (1) include a mono(monofluoro)pentylnaphthalenemonosulfonate ion, a di(monofluoro)pentylnaphthalenemonosulfonate ion, a mono(monofluoro)pentylnaphthalenedisulfonate ion, a mono(octafluoro)pentylnaphthalenemonosulfonate ion, a di(octafluoro)pentylnaphthalenemonosulfonate ion, and a mono(octafluoro)pentylnaphthalenedisulfonate ion. As to effects of a decrease in an ESR and an increase in a heat resistance of the solid electrolytic capacitor, there is little difference if a mono-, di- or tri-compound of the fluoroalkyl group ($[C_aF_bH_{2a+1-b}]$ group) or a mono-, di- or tri-compound of the sulfonate ion group ($[SO_3^-]$ group) is included. Thus, any such compound or a mixture thereof may be used.

The solid electrolytic capacitor containing at least the fluoroalkylnaphthalenesulfonate ion as the dopant of the solid electrolyte layer has a low ESR before a reflow, and the low ESR is maintained after the reflow. The reflow implies that an electronic component such as a capacitor is soldered to a board by application of heat. The low ESR after the reflow means that the capacitor has a high heat resistance. Since a fluorine atom having a larger diameter substitutes for at least one hydrogen atom of the alkyl group in the fluoroalkylnaphthalenesulfonate ion, a desorption from the conductive polymer may not easily occur at a high temperature, and therefore the low ESR can be maintained and the heat resistance may be increased.

In the solid electrolytic capacitor according to the present invention, the solid electrolyte layer can include the conductive polymer further containing a tetrahydronaphthalenesulfonate ion as the dopant. The tetrahydronaphthalenesulfonate ion used in the present invention is expressed as the following general formula (2).

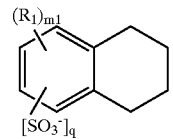

(2)

In general formula (2), m1 represents a number of an alkyl group ($R_1$ group), which can be an arbitrary integer not less than 0 within an allowable range for substitution. A character q represents a number of a sulfonate ion group ($[SO_3^-]$ group), which can be an arbitrary integer not less than 1 within an allowable range for substitution. In addition, $R_1$ represents an alkyl group having a carbon number of 1–20. A tetrahydronaphthalenesulfonate ion including at least one alkyl group ($R_1$ group) (m1≧1) has stronger emulsification property to the conductive polymer and is more soluble as compared with a tetrahydronaphthalenesulfonate ion including no alkyl group ($R_1$ group) (m1=0). The heat resistance tends to decrease if the carbon number of the alkyl group ($R_1$ group) is larger than 20. When two or more alkyl groups ($R_1$ groups) are included, carbon numbers of respective alkyl groups ($R_1$ groups) may be different from each other, or may be the same.

Specific examples of the tetrahydronaphthalenesulfonate ion expressed as general formula (2) include a tetrahydronaphthalenemonosulfonate ion, a tetrahydronaphthalenedisulfonate ion, a monobutyltetrahydronaphthalenemonosulfonate ion, a monobutyltetrahydronaphthalenedisulfonate ion, a diisopropyltetrahydronaphthalenemonosulfonate ion, and a dinonyltetrahydronaphthalenemonosulfonate ion. As to the effect of a decrease in an LC (Leaked Current) of the solid electrolytic capacitor, there is little difference if a mono-, di- or tri-compound of the sulfonate ion group ($[SO_3^-]$ group) or a mono-, di- or tri-compound of the alkyl group ($R_1$ group) is included. Thus, any such compound or a mixture thereof may be used.

The tetrahydronaphthalenesulfonate ion is a dopant which has a low heat resistance and a high ESR after the reflow but decreases the LC and, by using it in combination with the fluoroalkylnaphthalenesulfonate ion, the LC can be decreased while the low ESR is maintained.

In addition, in the solid electrolytic capacitor according to the present invention, the solid electrolyte layer can include the conductive polymer further containing a naphthalenesulfonate ion as the dopant. The naphthalenesulfonate ion used in the present invention is expressed as the following general formula (3).

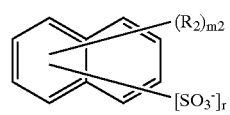

(3)

In general formula (3), m2 represents a number of an alkyl group ($R_2$ group), which can be an arbitrary integer not less than 0 within an allowable range for substitution. A character r represents a number of a sulfonate ion group ($[SO_3^-]$ group), which can be an arbitrary integer not less than 1 within an allowable range for substitution. In addition, $R_2$ represents an alkyl group having a carbon number of 1–20. A naphthalenesulfonate ion including at least one alkyl group ($R_2$ group) (m2≧1) has stronger emulsification property to the conductive polymer and is more soluble as compared with a naphthalenesulfonate ion including no alkyl group ($R_2$ group) (m2=0). The heat resistance tends to decrease if the carbon number of the alkyl group ($R_2$ group) is larger than 20. When two or more alkyl groups ($R_2$ groups) are included, carbon numbers of respective alkyl groups ($R_2$ groups) may be different from each other, or may be the same. It is to be noted that, in general formula (3), the alkyl group ($R_2$ group) and sulfonate ion group ($[SO_3^-]$ group) shown in positions penetrating both aromatic rings of a naphthalene ring mean that, the alkyl group ($R_2$ group) and sulfonate ion group ($[SO_3^-]$ group) can locate in any positions in the naphthalene ring within an allowable range for substitution for hydrogen of the naphthalene ring, provided that the condition of orientation is satisfied.

Specific examples of the naphthalenesulfonate ion expressed as general formula (3) include a naphthalenemonosulfonate ion, a naphthalenedisulfonate ion, a monomethylnaphthalenemonosulfonate ion, a dimethylnaphtalenemonosulfonate ion, a dimethylnaphthalenedisulfonate ion, a monobutylnaphthalenemonosulfonate ion, a dibutylnaphthalenemonosulfonate ion, and a dibutylnaphthalenedisulfonate ion. As to the effect of a decrease in the LC of the solid electrolytic capacitor, there is little difference if a mono-, di- or tri-compound of the sulfonate ion group ($[SO_3^-]$ group) or a mono-, di- or tri-compound of the alkyl group ($R_2$ group) is included. Thus, any such compound or a mixture thereof may be used.

The naphthalenesulfonate ion is a dopant which has a high ESR but decreases the LC and, by using it in combination with the fluoroalkylnaphthalenesulfonate ion, the LC can be decreased while the low ESR is maintained.

In addition, in the solid electrolytic capacitor according to the present invention, the solid electrolyte layer can include the conductive polymer further containing a benzenesulfonate ion as the dopant. The benzenesulfonate ion used in the present invention is expressed as the following general formula (4).

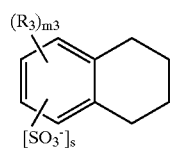

(4)

In general formula (4), m3 represents a number of an alkyl group ($R_3$ group), which can be an arbitrary integer not less than 0 within an allowable range for substitution. A character s represents a number of a sulfonate ion group ($[SO_3^-]$ group), which can be an arbitrary integer not less than 1 within an allowable range for substitution. In addition, $R_3$ represents an alkyl group having a carbon number of 1–20. A benzenesulfonate ion including at least one alkyl group ($R_3$ group) (m3≧1) has stronger emulsification property to the conductive polymer and is more soluble as compared with a benzenesulfonate ion including no alkyl group ($R_3$ group) (m3=0). The heat resistance tends to decrease if the carbon number of the alkyl group ($R_3$ group) is larger than 20. When two or more alkyl groups ($R_3$ groups) are included, carbon numbers of respective alkyl groups ($R_3$ groups) may be different from each other, or may be the same.

Specific examples of the benzenesulfonate ion expressed as general formula (4) include a benzenemonosulfonate ion, a benzenedisulfonate ion, a monododecylbenzenemonosulfonate ion, a monododecylbenzenedisulfonate ion, a monooctylbenzenemonosulfonate ion, and a dioctylbenzenemonosulfonate ion. As to the effect of a decrease in the LC of the solid electrolytic capacitor, there is little difference if a mono-, di- or tri-compound of the sulfonate ion group ($[SO_3^-]$ group) or a mono-, di- or tri-compound of the alkyl group ($R_3$ group) is included. Thus, any such compound or a mixture thereof may be used.

The benzenesulfonate ion is a dopant which has a high ESR but decreases the LC and, by using it in combination with the fluoroalkylnaphthalenesulfonate ion, the LC can be decreased while the low ESR is maintained.

In the present invention, a ratio of the fluoroalkylnaphthalenesulfonate ion is preferably 20 mol % to 60 mol % of a total amount of the dopant. With 20 mol % to 60 mol % of the fluoroalkylnaphthalenesulfonate ion, a multiplier effect of a combination of the fluoroalkylnaphthalenesulfonate ion and the tetrahydronaphthalenesulfonate ion, the naphthalenesulfonate ion or the benzenesulfonate ion is increased, and thus the low ESR after the reflow of the solid electrolytic capacitor can be maintained and the LC can be decreased. From this standpoint, the ratio of the fluoroalkylnaphthalenesulfonate ion is more preferably 30 mol % to 50 mol % of a total amount of the dopant.

It is to be noted that, at least one of the tetrahydronaphthalenesulfonate ion, the naphthalenesulfonate ion and the benzenesulfonate ion can be used in combination with the fluoroalkylnaphthalenesulfonate ion as the dopant, and two or more can also be used.

Though the conductive polymer used in the present invention is not specifically limited, a conductive polymer having a heterocycle such as polypyrrole, polythiophene or polyaniline is preferably used. Polypyrrole is especially preferable because a solid electrolyte layer of high quality is formed with electrolytic polymerization.

The solid electrolytic capacitor has a structure such that, as shown in FIG. 1, on a surface of anode body 1 including a sintered valve metal such as tantalum, niobium, titanium, or aluminum, dielectric coating 2 formed by oxidization of the surface of anode body 1, solid electrolyte layer 3, a carbon layer 4 containing conductive carbon, and a cathode extraction layer 5 including silver paste are successively formed to construct a capacitor element 8, an anode terminal 20 is connected to an anode lead member 10 inserted into anode body 1 from one end surface thereof, a cathode terminal 21 is connected to cathode extraction layer 5, and capacitor element 8 formed as described above is covered and sealed with an exterior resin 7 such as an epoxy resin.

The solid electrolytic capacitor according to the present invention will be described more specifically based on examples. In the following examples and comparative examples, each sulfonate ion used had a mono-compound as to the sulfonate ion group or the alkyl group as a main component. Thus, a prefix "mono-" is omitted in the following descriptions of names of sulfonate ions or sulfonates in the examples and comparative examples.

EXAMPLE 1

Referring to FIG. 1, for anode body 1 of a rectangular parallelepiped of 4.36 mm×3.26 mm×0.90 mm formed with sintered tantalum (Ta), having anode lead member 10 inserted thereto from one end surface thereof (a 3.26 mm×0.90 mm surface), anodic oxidation was performed in an aqueous solution of phosphoric acid to form dielectric coating 2 on a surface thereof, and electrolytic polymerization was performed using a polymerization solution described below to form solid electrolyte layer 3 on dielectric coating 2. Then, carbon layer 4 and cathode extraction layer 5 were successively formed on solid electrolyte layer 3 to form capacitor element 8. Furthermore, anode terminal 20 was welded to anode lead member 10 and cathode terminal 21 was connected to cathode extraction layer 5 with a conductive adhesive, and thereafter, an outer surface of capacitor element 8 was covered and sealed with exterior resin 7 formed with an epoxy resin to make a solid electrolytic capacitor.

For forming the solid electrolyte layer, the polymerization solution prepared by adding pyrrole (0.2 M: a molarity to the whole polymerization solution, which is the same as below) for forming the conductive polymer and sodium octafluoropentylnaphthalenesulfonate (0.2 M) to be the dopant to water as a solvent was used. In the polymerization solution, sodium octafluoropentylnaphthalenesulfonate is dissociated to an octafluoropentylnaphthalenesulfonate ion and a sodium ion, and the octafluoropentylnaphthalenesulfonate ion is incorporated into polypyrrole as the dopant during the polymerization to form the solid electrolyte layer. The manner is similar for other sodium sulfonates. A sulfonate compound as a material of the dopant is not specifically limited provided that it can be dissociated to a sulfonate ion and a counterion thereof in the polymerization solution, which can be sulfonic acid, potassium sulfonate, ammonium sulfonate, or the like besides sodium sulfonate mentioned above.

After the reflow of the solid electrolytic capacitor obtained as above, the ESR and LC were measured. A method and a condition of the reflow included four steps as follows. A temperature was increased to 150° C. within 60 seconds in a first step, held at 150° C. for at most 120 seconds in a second step, increased from 150° C. to 200° C. within 30 seconds in a third step, and then increased from 200° C. to 250° C., held at 250° C. for at most 5 seconds, and decreased from 250° C. to 200° C. within 40 seconds in a fourth step. Table 1 shows the ESRs and LCs.

COMPARATIVE EXAMPLES 1–4

Solid electrolytic capacitors were formed as described in example 1 except that compounds having molarities as shown in Table 1 were used as polymerization solutions of electrolytic polymerization, and the ESRs and LCs after the reflow were measured as in example 1. The results are shown in Table 1.

TABLE 1

| | Conductive Monomer (Molarity) | Dopant (Molarity) | | ESR (mΩ) | LC (μA) |
|---|---|---|---|---|---|
| Example 1 | Pyrrole (0.2) | OFPN (0.2) | | 10.2 | 140 |
| Comparative Example 1 | Pyrrole (0.2) | BTHN (0.2) | | 21.7 | 10 |
| Comparative Example 2 | Pyrrole (0.2) | | BN (0.2) | 20.4 | 11 |
| Comparative Example 3 | Pyrrole (0.2) | | MN (0.2) | 22.6 | 10 |
| Comparative Example 4 | Pyrrole (0.2) | | DB (0.2) | 25.4 | 9 |

OFPN: octafluoropentylnaphthalenesulfonate ion
BTHN: butyltetrahydronaphthalenesulfonate ion
BN: butylnaphthalenesulfonate ion
MN: methylnaphthalenesulfonate ion
DB: dodecylbenzenesulfonate ion As shown in Table 1, though the solid electrolytic capacitor containing the octafluoropentylnaphthalenesulfonate ion (hereafter referred to as OFPN) as the dopant (example 1) had a little larger LC as compared with other dopants, it had a substantially low ESR such as 10.2 mΩ.

EXAMPLES 2–5

Solid electrolytic capacitors were formed as described in example 1 except that compounds having molarities as shown in Table 2 were used as polymerization solutions of electrolytic polymerization to allow inclusion of OFPN and another kind of sulfonate ion as the dopants. The ESRs and LCs after the reflow were measured as in example 1. The results are shown in Table 2 together with that of example 1.

TABLE 2

| | Conductive Monomer (Molarity) | Dopant (Molarity) | | | ESR (mΩ) | LC (μA) |
|---|---|---|---|---|---|---|
| Example 1 | Pyrrole (0.2) | OFPN (0.2) | | | 10.2 | 140 |
| Example 2 | Pyrrole (0.2) | OFPN (0.1) | BTHN (0.1) | | 12.3 | 30 |
| Example 3 | Pyrrole (0.2) | OFPN (0.1) | | BN (0.1) | 10.8 | 18 |
| Example 4 | Pyrrole (0.2) | OFPN (0.1) | | MN (0.1) | 12.5 | 20 |
| Example 5 | Pyrrole (0.2) | OFPN (0.1) | | DB (0.1) | 13.1 | 24 |

OFPN: octafluoropentylnaphthalenesulfonate ion
BTHN: butyltetrahydronaphthalenesulfonate ion
BN: butylnaphthalenesulfonate ion
MN: methylnaphthalenesulfonate ion
DB: dodecylbenzenesulfonate ion As shown in Table 2, by containing the OFPN and a butyltetrahydronaphthalenesulfonate ion (hereafter referred to as BTHN), the OFPN and a butylnaphthalenesulfonate ion (hereafter referred to as BN), the OFPN and a methylnaphthalenesulfonate ion (hereafter referred to as MN), or the OFPN and a dodecylbenzenesulfonate ion (hereafter referred to as DB) as the dopants, the LC can be decreased while the low ESR is maintained.

EXAMPLES 6–10

To examine differences in the ESR and LC characteristics of the solid electrolytic capacitors according to values of mol % of OFPN when OFPN and BTHN were used as the dopants, solid electrolytic capacitors were formed as described in example 1 except that compounds having molarities as shown in Table 3 were used as polymerization solutions of electrolytic polymerization, and the ESRs and LCs after the reflow were measured as in example 1. The results are shown in Table 3.

TABLE 3

| | Conductive Monomer (Molarity) | Dopant (Molarity) | | Dopant (Mol %) | ESR (mΩ) | LC (μA) |
|---|---|---|---|---|---|---|
| Example 6 | Pyrrole (0.2) | OFPN (0.02) | BTHN (0.18) | OFPN(10) BTHN(90) | 18.2 | 12 |
| Example 7 | Pyrrole (0.2) | OFPN (0.06) | BTHN (0.14) | OFPN(30) BTHN(70) | 14.3 | 19 |
| Example 8 | Pyrrole (0.2) | OFPN (0.1) | BTHN (0.1) | OFPN(50) BTHN(50) | 12.3 | 30 |
| Example 9 | Pyrrole (0.2) | OFPN (0.14) | BTHN (0.06) | OFPN(70) BTHN(30) | 11.2 | 78 |
| Example 10 | Pyrrole (0.2) | OFPN (0.18) | BTHN (0.02) | OFPN(90) BTHN(10) | 10.4 | 102 |

OFPN: octafluoropentylnaphthalenesulfonate ion
BTHN: butyltetrahydronaphthalenesulfonate ion As shown in Table 3, the ESR is significantly increased when OFPN is less than 20 mol % of the total amount of the dopants, and the LC is significantly increased when the value is more than 60 mol %. Therefore, the mol % value of OFPN to the total amount of the dopants is preferably 20 mol % to 60 mol %, and more preferably 30 mol % to 50 mol %.

As described above, the present invention can be widely utilized for the solid electrolytic capacitors for the purpose of decreasing the ESR.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A solid electrolytic capacitor formed with a dielectric coating and a solid electrolyte layer successively formed on a surface of an anode body; wherein
   said solid electrolyte layer includes a conductive polymer containing at least a fluoroalkylnaphthalenesulfonate ion as a dopant.

2. The solid electrolytic capacitor according to claim 1, wherein
   a ratio of said fluoroalkylnaphthalenesulfonate ion is 20 mol % to 60 mol % of a total amount of said dopant.

3. The solid electrolytic capacitor according to claim 1, wherein
   said conductive polymer is polypyrrole.

4. The solid electrolytic capacitor according to claim 1, wherein
   said solid electrolyte layer includes the conductive polymer further containing a tetrahydronaphthalenesulfonate ion as said dopant.

5. The solid electrolytic capacitor according to claim 4, wherein
   a ratio of said fluoroalkylnaphthalenesulfonate ion is 20 mol % to 60 mol % of a total amount of said dopant.

6. The solid electrolytic capacitor according to claim 4, wherein
   said conductive polymer is polypyrrole.

7. The solid electrolytic capacitor according to claim 1, wherein
   said solid electrolyte layer includes the conductive polymer further containing a naphthalenesulfonate ion as said dopant.

8. The solid electrolytic capacitor according to claim 7, wherein
   a ratio of said fluoroalkylnaphthalenesulfonate ion is 20 mol % to 60 mol % of a total amount of said dopant.

9. The solid electrolytic capacitor according to claim 7, wherein
   said conductive polymer is polypyrrole.

10. The solid electrolytic capacitor according to claim 1, wherein
    said solid electrolyte layer includes the conductive polymer further containing a benzenesulfonate ion as said dopant.

11. The solid electrolytic capacitor according to claim 10, wherein
    a ratio of said fluoroalkylnaphthalenesulfonate ion is 20 mol % to 60 mol % of a total amount of said dopant.

12. The solid electrolytic capacitor according to claim 10, wherein
    said conductive polymer is polypyrrole.

* * * * *